Patented May 6, 1952

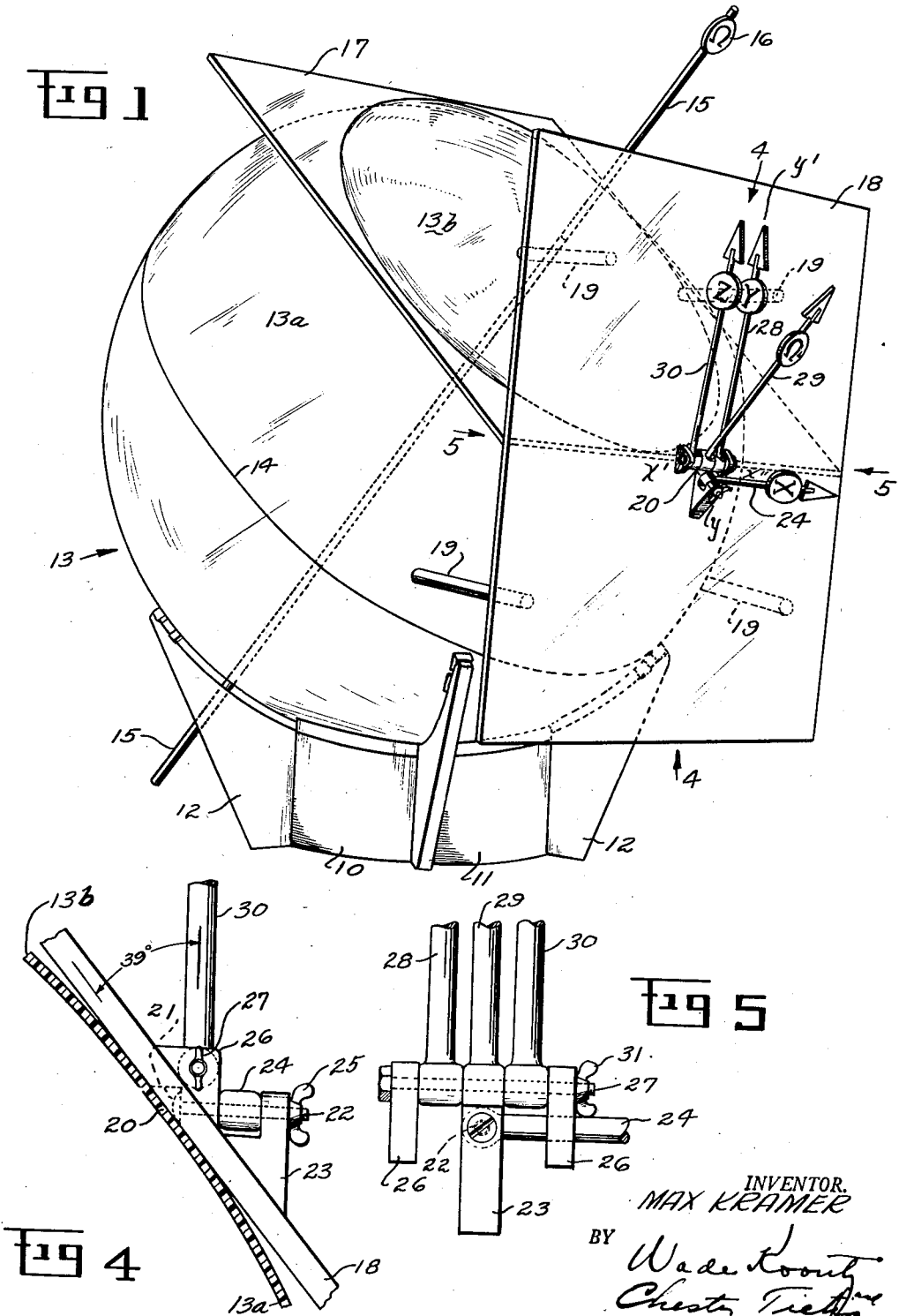

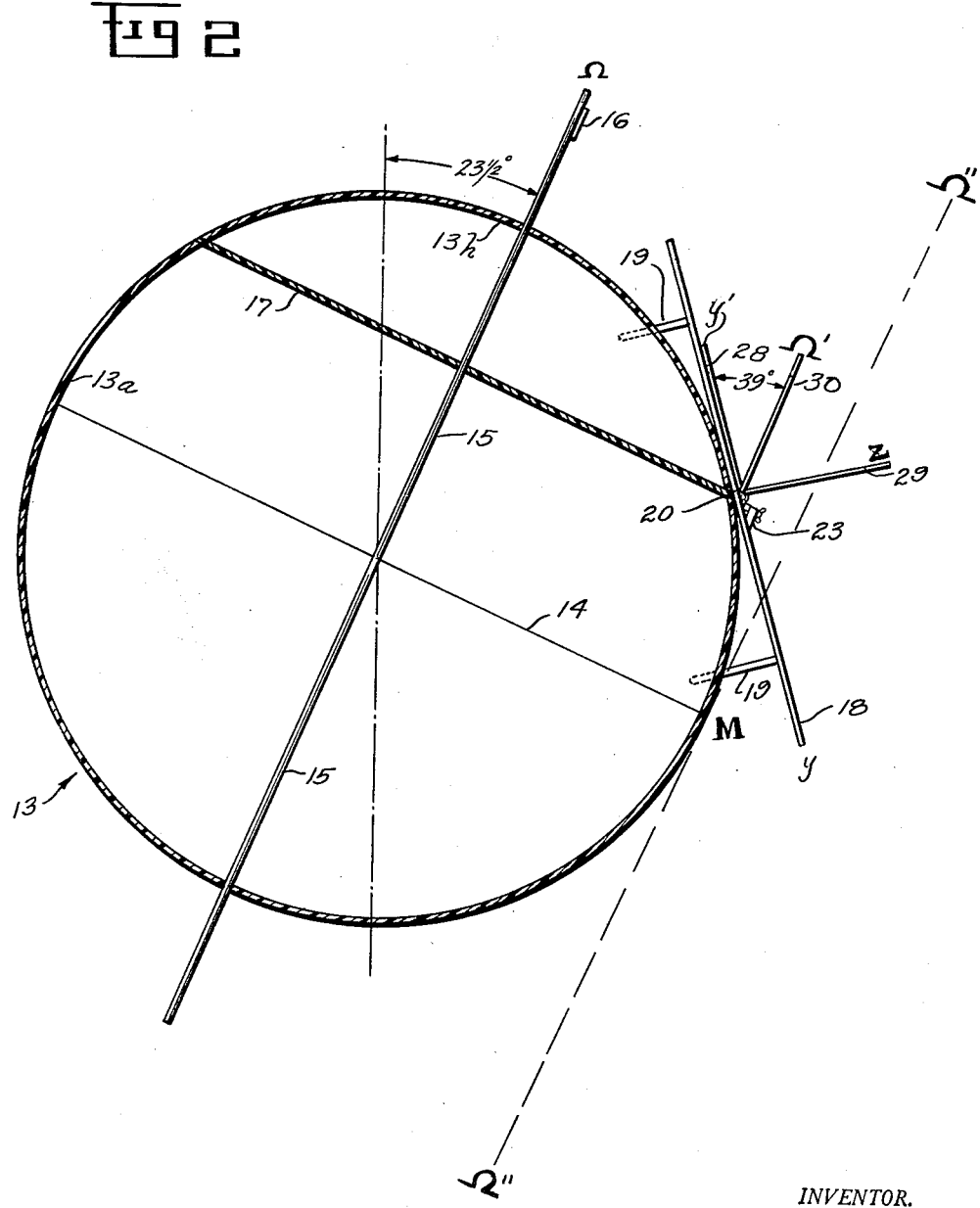

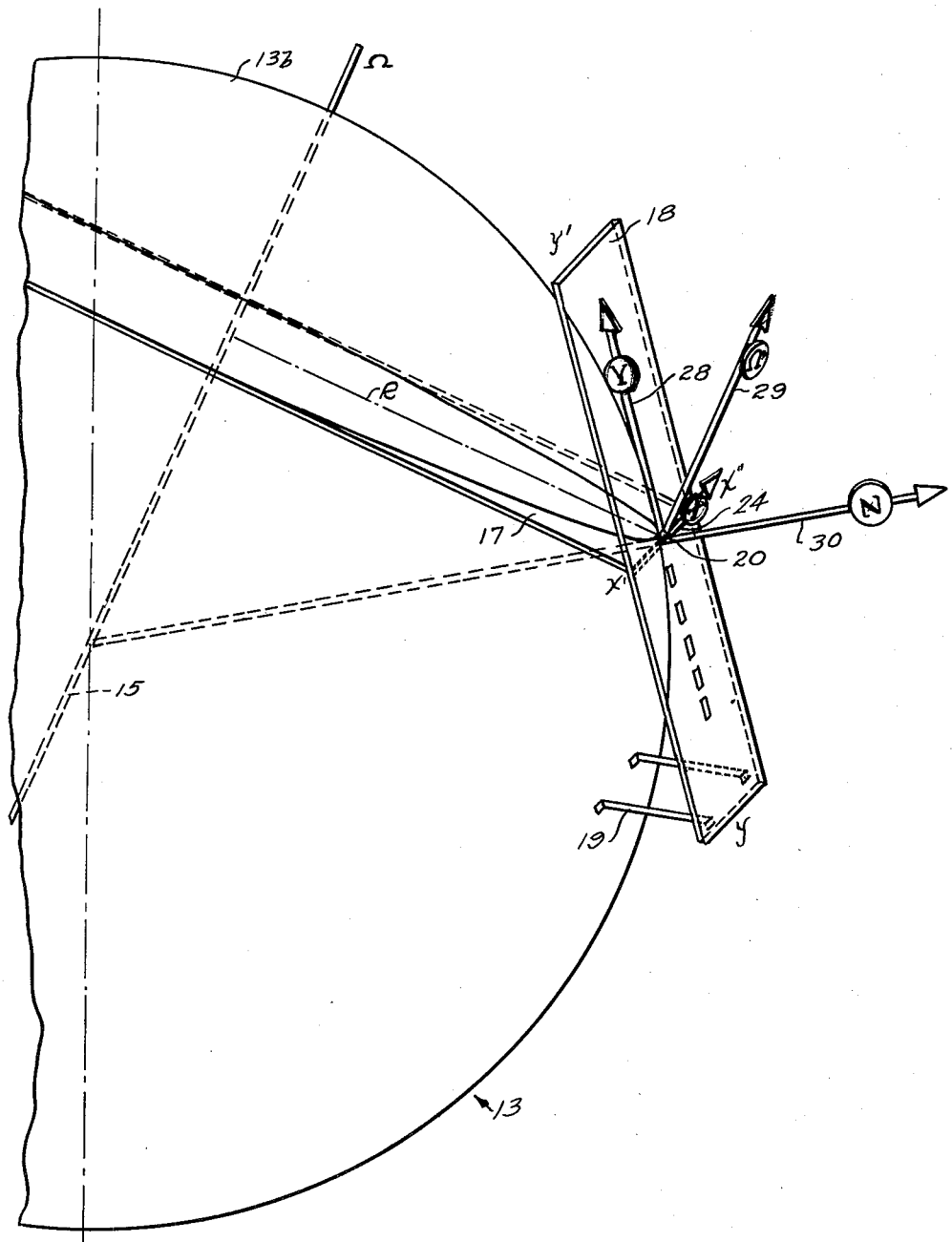

2,595,273

UNITED STATES PATENT OFFICE 2,595,273

TRAINER DEMONSTRATOR FOR SET OF SPACE COORDINATES FIXED TO THE EARTH

Max Kramer, Las Cruces, N. Mex.

Application April 13, 1951, Serial No. 220,961

3 Claims. (Cl. 35—47)

(Granted under the act of March 3, 1883, as amended April 30, 1928; 370 O. G. 757)

The invention described herein may be manufactured and used by or for the Government for governmental purposes without payment to me of any royalty thereon.

This invention relates to a trainer demonstrator adapted to illustrate a set of space coordinates fixed to the earth.

In the instruction of student meteorologists and navigators who must understand the relations of the various axes of the earth to the heavenly bodies, considerable confusion and misunderstanding is apt to occur unless some tangible instrument is provided, by means of which the various astronomical and methodical conceptions can be realistically illustrated.

Briefly stated, this invention comprises a plastic globe which represents the earth and which is supported on a fixed stand at an angle identical with the inclination of the earth to the plane of the ecliptic. The sphere representing the earth is cut by a zonal plane which passes through a fixed point on the surface of the sphere. A second plane passes through this fixed point and is tangent to the surface of the sphere at this point. This fixed point is provided on the demonstrator with several vectors representing the space coordinates and the vector Ω' representing the angular velocity of the earth's rotation.

One object of the invention therefore is to provide a trainer-demonstrator capable of illustrating a set of space coordinates fixed to the earth. The trainer is intended to be capable of demonstrating the perception of the spatial relationships in the interpretation of the general equations of motion.

Another object of the invention is to provide a trainer-demonstrator of the above nature in which the various vectors of the equation are represented by hinged arrows each proportional in length to the force it represents, which bear indicia and which are capable of angular adjustment to coincide with the direction in which the represented force acts.

Referring now to the drawings:

Fig. 1 is a side elevation of the device showing the relationships of the various planes to each other and to the sphere and its axis.

Fig. 2 is a vertical section taken through the sphere and planes shown in Fig. 1, the stand not being shown in Fig. 2, the sections taken vertically through the sphere and planes in such a manner as to bisect the sphere and planes vertically through the exact center thereof.

Fig. 3 is a partial perspective view of the instrument taken from such an oblique angle as to show how the coordinates of a point on the sphere's surface may be used to illustrate the interaction of forces. The view is somewhat schematic.

Fig. 4 is a fragment of a vertical section taken along the line 4—4 of Fig. 1.

Fig. 5 is the view taken from the rear of the line 5—5 on Fig. 1 at the middle thereof and showing the mountings of the vector-representing arrows.

Referring again to Fig. 1, 10 is a stand having a generally cylindrical portion 11 from which project a plurality of buttresses 12 to form an upper frame work capable of receiving snugly the lower portion of a large plastic sphere 13 which represents the earth. The base enables the sphere to be rotated without lifting it from the base. The sphere 13 is preferably made of transparent plastic and is grooved or otherwise marked with a line 14 representing the equator. Extending completely through the sphere and projecting from both poles thereof is a rod 15 which bears at its upper end an indicia plate 16 which is marked with a symbol Ω. The rod 15 is inclined 23½° from the vertical, this angle representing inclination of the earth through the plane of the ecliptic.

The sphere 13 is divided into a lower and upper portion respectively 13a and 13b by a sheet 17 of plastic which is exactly perpendicular to the rod 15. The sheet intersects the sphere at latitude 40° north and extends to such a distance that it meets a second plane 18 which is tangential to the sphere. The sheet 17 meets the tangential plane at all points on its lower edge. A second plastic sheet representing the plane 18 is tangential to the sphere 13 at the point 20 and is tilted toward the rod 15 at an angle which is 39° from an imaginary line Ω" as shown in Fig. 2. The line Ω" is exactly parallel to the rod 15 but represents a plane which is tangential to the sphere 13 at the point M. It is therefore to be understood that three axes are drawn through a point 20 on the surface of the sphere. These are, respectively, the X axis which lies in the tangential plane and in the direction of rotation of the earth on its polar axis; the Y axis which lies in the tangential plane but perpendicular to the X axis; and the Z axis which is perpendicular to the tangential plane and may be considered as the extension of a diameter of the earth through the fixed point 20.

Four or more rods 19 space the rear surface of the plane 18 from the surface of the sphere. The plane 18 may be cemented or mechanically fastened, as with screws (not shown) to the rods 19. Support at the proper inclination is assured by precise control of the length of the rods.

Referring now to Figs. 4 and 5, a sectioned portion of the sphere 13 (cross section 13a and 13b) upon which the plane 18 lies tangent to 13a and 13b at the point 20. This point lies under a hollow portion 21 in the material of the plane 18 along the longitudinal axis of a bolt 22 which extends through a support 23 and hub of vector arrow 24. The bolt 22 is provided with a wing nut 25. A second bolt 27 extends through the pivot supports 26 and acts as a pivot for the vector arrows 28, 29 and 30. A wing nut 31 is also provided for the bolt 27.

The hydrodynamic equations of motion are derived by vector methods. The equations are first derived for the motion of a particle moving in space with respect to an absolute and a moving set of coordinates. Then the fixed coordinates are placed with the origin at any point on the earth's surface and the relative motion of the particle is studied with respect to the earth, the zonal plane containing this point, and a tangential plane passing through the same point. This relative motion involves both the translational and rotational components of the time rate of change of the position vector with respect to both the absolute and relative frames of reference and the relation between the origins of these frames of reference.

The six directions: North-south along the Y-axis, east-west along the X-axis, up-down along the Z-axis, are then defined with reference to the above planes. The instrument is used to demonstrate clearly how the sense of these cardinal directions vary in space with relation to the position of the observer on the earth. These directions are supplemented by the vector $\Omega$, representing the angular velocity of the earth's rotation, and defined along the polar axis of the earth, and the translation of $\Omega$ to the same origin (point 20) on the earth's surface, now referred to as $\Omega'$. In deriving and applying the equations of motion, it is necessary that the students be given a clear spatial picture of the above. In particular, it is necessary to perceive the direction in which the gravitational force acts, that $\Omega'$ is perpendicular to the X-axis and has components along the Y and Z axes, that $\Omega \times R = \Omega \times K$ where R is the radius of the zonal plane and K the position vector drawn from any point on the axis of the earth to any point on the zonal circle, that the term $\Omega \times \Omega \times R$ defines the centripetal force which acts in the zonal plane directed toward the axis of the earth, that the term $2V \times \Omega$ represents the Coriolis force. It is in connection with the last item that the demonstrator was designed to have movable X—Y—Z axes because the direction of the resultant of the cross-product of two vectors is defined by the rotation of one of the two vectors toward the other.

An example of this demonstration is in the mathematical treatment of Coriolis force. Coriolis force is the name applied to the deflecting influence of the earth's rotation on a body in horizontal motion. This influence appears to exist when observed from a point on the earth's surface but does not exist when observed from a point in space.

The earth's rotation observed from a point in space is a rotation about its polar axis but when observed from a point on the earth's surface (not on the equator) it is a rotation about an axis which is the diameter of the earth which passes through the observer (proven by Foucault's pendulum experiment). Coriolis force can then be illustrated by considering a projectile fired by the observer on earth at a distant target. Since the earth rotates from right to left (counterclockwise) beneath an observer standing in the Northern Hemisphere (like a phonograph turntable), the projectile will pass to the right of the distant target at which it was aimed. This apparent deflecting force is expressed mathematically as the cross product of two vector quantities, $2V \times \Omega$, where V is the velocity vector in the plane tangent to the earth at the point of observation and $\Omega$ is the vector represesenting the angular velocity of the earth's rotation on the polar axis. The vector V and the vector $\Omega$ can be demonstrated by this invention and also the Coriolis force, which is the cross product of these vectors, can be demonstrated and shown to act always to the right in the Northern Hemisphere. It therefore follows that air in horizontal movement in the Northern Hemiphere will have a tendency to be deflected to the right of its direction of travel, which is in fact the case.

The solutions of two problems in which the trainer demonstrator is of value are given below.

The movable portion of the demonstrator is operated by moving one of the vector arrows X, Y or Z singly toward the vector $\Omega'$ in order to indicate objectively the sense of a particular cross product or vector product. Problem II especially illustrates such application.

PROBLEM I

Convert the vector form of the equation of motion into the Cartesian form.

*Solution*

(1) We have $$f = 2V \times \Omega + g - \frac{1}{\rho} \Delta P + F_{ex}$$

where $F_{ex}$ contains all the external forces, such as frictional and turbulence.

(2) To find the three components of the Coriolis force, we have:

$$2V \times \Omega = 2 \begin{vmatrix} i & j & k \\ u & v & w \\ \Omega_x & \Omega_y & \Omega_z \end{vmatrix} = 2[i(V\Omega_z - W\Omega_y)$$
$$+ j(W\Omega_x - U\Omega_z) + K(U\Omega_y - V\Omega_x)]$$

The trainer-demonstrator clearly shows that $\Omega_x = 0$ since $\Omega \perp X$-axis, that $\Omega$ does have components along the Y and Z axes where $$\Omega_y = \Omega \cos \phi$$

$\Omega_z = \Omega \sin \phi$ where $\phi$ is the angle of latitude. Hence the X, Y, Z components of the Coriolis term are: $2\Omega(V \sin \phi - W \cos \phi)$, $-2\Omega U \sin \phi$, and $2\Omega U \cos \phi$ respectively.

(3) The trainer-demonstator also makes it clear that the three components of the gravitational term are $G_x = 0$, $G_y = 0$, $G_z = -G$ since G is directed toward the center of the earth.

(4) Since $$\frac{1}{\rho}\Delta P = i\frac{1}{\rho}\frac{\delta P}{\delta X} + j\frac{1}{\rho}\frac{\delta P}{\delta Y} + K\frac{1}{\rho}\frac{\delta P}{\delta Z}$$

and $f$ has the components $$\frac{du}{dt}, \frac{dv}{dt}, \frac{dw}{dt}$$

we have:

(a) $f_x = \dfrac{du}{dt} = 2\Omega(V \sin \phi - W \cos \phi) - \dfrac{1}{\rho}\dfrac{\delta P}{\delta X} + F_x$ $f_y = \dfrac{dv}{dt} = -2\Omega U \sin \phi - \dfrac{1}{\rho}\dfrac{\delta P}{\delta Y} + F_y$ $f_z = \dfrac{dw}{dt} = 2\Omega U \cos \phi - \dfrac{1}{\rho}\dfrac{\delta P}{\delta Z} - G + F_z$ where $F_x$, $F_y$, $F_z$ are the components of $F_{ex}$.

PROBLEM II

Tabulate the data showing the direction in which the Coriolis force would act at the instant that a fluid particle is given an impulse in the indicated direction. Consider the particle located at any point on the earth's surface north of the Equator and south of the North Pole, then at the Equator, and at the North Pole.

Solution

| Direction of Impulse | (1) Northern Hemisphere (not at Equator or pole) | (2) Equator | (3) North Pole |
|---|---|---|---|
| (a) | East | Southward and upward. | Up | Southward. |
| (b) | West | Northward and Down. | Down | Northward. |
| (c) | North | Eastward | None | Eastward. |
| (d) | South | Westward | ...do | Westward. |
| (e) | Up | ...do | Westward | None. |
| (f) | Down | Eastward | Eastward | Do. |

The solution of the problem is based upon the following definition of the vector product of two vectors: If $\vec{C} = \vec{A} \times \vec{B}$, the magnitude of C is given by $A B \sin \theta$ where $\theta$ is the angle between the two vectors, and the sense of direction of $\vec{C}$ is given by a right-handed rotation of $\vec{A}$ toward $\vec{B}$ through the angle $\theta$. We are here interested in the sense of direction.

To solve part (a): By manually rotating the X-vector (24 on Fig. 4) toward the translated $\Omega$ vector, $\Omega_2$ (29 on Figs. 1 and 5) one observes that $U \times \Omega$ gives a resultant vector pointing southward and upward. When the set of coordinates are moved to the Equator, by a rotation of the X-axis toward $\Omega'$, one observes that $U \times \Omega$ gives a resultant vector pointing only upward. At the North Pole, $U \times \Omega$ leads to a resultant vector pointing southward. In part (b1), $-U \times \Omega$ give a resultant vector pointing northward and downward. In part (c1), $V \times \Omega$ give a resultant vector pointing eastward in the tangential plane.

What I claim is:

1. In a trainer-demonstrator for illustrating the equations of motion, a sphere representing the earth, a first plane intersecting said sphere at 40° north latitude, a second plane tangent to the sphere at a point lying on the line of intersection of the first plane and the sphere, said second plane being inclined at an angle of 39° from vertical toward the north-south axis of the sphere, a plurality of arrows representing vectors mounted on said second plane substantially at the point of tangency, at least one of said arrows being pivotable along the line of intersection of the two planes and the remainder being pivotable in a direction perpendicular to said named arrow.

2. Apparatus according to claim 1 made completely of transparent plastic material.

3. Apparatus according to claim 1 and in addition a base for said sphere comprising an upright substantially cylindrical central part, a plurality of buttresses extending outward therefrom and curved on their upper surfaces substantially to fit the sphere, whereby to provide a support upon which the sphere can be shifted without lifting it.

MAX KRAMER.

No references cited.